(12) United States Patent
Greenberg et al.

(10) Patent No.: US 9,836,490 B2
(45) Date of Patent: Dec. 5, 2017

(54) SYSTEMS, METHODS AND TOOLS FOR FACILITATING GROUP COLLABORATIONS

(71) Applicant: International Business Machines Corporation, Armonk, NY (US)

(72) Inventors: Mark Greenberg, Toronto (CA); Wojciech Gryc, Toronto (CA); Nicolas Picard, Philadelphia, PA (US); Vivek Sekhar, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/187,934

(22) Filed: Feb. 24, 2014

(65) Prior Publication Data
US 2014/0172787 A1 Jun. 19, 2014

Related U.S. Application Data

(63) Continuation of application No. 11/583,657, filed on Oct. 19, 2006, now abandoned.

(30) Foreign Application Priority Data

Oct. 26, 2005 (CA) .................................... 2524527

(51) Int. Cl.
*G06F 17/00* (2006.01)
*G06F 17/30* (2006.01)
*G06Q 10/10* (2012.01)

(52) U.S. Cl.
CPC ....... *G06F 17/30327* (2013.01); *G06Q 10/10* (2013.01)

(58) Field of Classification Search
CPC .................................................. G06Q 10/103
See application file for complete search history.

(56) References Cited

U.S. PATENT DOCUMENTS 4,029,943 A 6/1977 Rodriguez
4,671,772 A 6/1987 Slade et al.
(Continued)

OTHER PUBLICATIONS

RCE (dated Nov. 5, 2013) for U.S. Appl. No. 11/366,517, filed Mar. 2, 2006, First Named Inventor Vivek Sekhar, Confirmation No. 4308
(Continued)

*Primary Examiner* — Neveen Abel Jalil
*Assistant Examiner* — Dawaune Conyers
(74) *Attorney, Agent, or Firm* — George R. McGuire; Bond Schoeneck & King, PLLC; John Pivnichny

(57) ABSTRACT

There are disclosed systems, method and tools for facilitating group collaborations. In an embodiment, collaborative ideas are represented in a modified tree data structure in which ideas are stored in nodes of the tree (an "idea tree"). Each node may be associated with data storage means, such as a table of records, in which different kinds of data can be stored. Data stored in the idea tree, or a part thereof, may be created, modified, deleted or organized by using various types of collaboration tools. A participant's interaction with the idea tree, or a part thereof, using a particular collaboration tool may be mapped as a transformation of the idea tree from one state to another. Other participants may simultaneously or successively interact with the idea tree, or a part thereof, using the same or a different collaboration tool. A coherent representation of collaborative ideas can be developed and organized without excessive manual effort.

13 Claims, 13 Drawing Sheets

(56) References Cited

U.S. PATENT DOCUMENTS

| | | |
|---|---|---|
| 5,072,385 A | 12/1991 | Rebeillard et al. |
| 5,433,615 A | 7/1995 | Clark |
| 5,615,134 A | 3/1997 | Newsham et al. |
| 5,740,035 A | 4/1998 | Cohen et al. |
| 5,893,098 A | 4/1999 | Peters et al. |
| 5,999,908 A | 12/1999 | Abelow |
| 6,047,288 A | 4/2000 | Kurosawa et al. |
| 6,064,980 A | 5/2000 | Jacobi et al. |
| 6,093,026 A | 7/2000 | Walker et al. |
| 6,236,975 B1 | 5/2001 | Boe et al. |
| 6,267,379 B1 | 7/2001 | Forrest et al. |
| 6,321,221 B1 | 11/2001 | Bieganski |
| 6,377,944 B1 | 4/2002 | Busey et al. |
| 6,421,724 B1 | 7/2002 | Nickerson et al. |
| 6,539,392 B1 | 3/2003 | Rebane |
| 6,574,638 B1 | 6/2003 | Gustman et al. |
| 6,577,846 B2 | 6/2003 | Poor |
| 6,606,581 B1 | 8/2003 | Nickerson et al. |
| 6,631,370 B1 | 10/2003 | Pekkanen |
| 6,754,635 B1 | 6/2004 | Hamlin et al. |
| 6,895,405 B1 | 5/2005 | Choi et al. |
| 6,912,521 B2 | 6/2005 | Kraft et al. |
| 6,928,392 B2 | 8/2005 | Nickerson et al. |
| 6,993,495 B2 | 1/2006 | Smith, Jr. et al. |
| 7,386,797 B1 | 6/2008 | Chatterjee et al. |
| 2001/0034015 A1 | 10/2001 | Raichur et al. |
| 2001/0052122 A1 | 12/2001 | Nanos et al. |
| 2002/0002482 A1 | 1/2002 | Thomas |
| 2002/0023144 A1 | 2/2002 | Linyard et al. |
| 2002/0026471 A1* | 2/2002 | Bent et al. ............... 709/101 |
| 2002/0120491 A1 | 8/2002 | Nelson |
| 2002/0120619 A1 | 8/2002 | Marso et al. |
| 2003/0099402 A1 | 5/2003 | Baylis |
| 2003/0101088 A1 | 5/2003 | Lohavichan |
| 2003/0120687 A1 | 6/2003 | Solomon et al. |
| 2005/0033807 A1* | 2/2005 | Lowrance ............... H04L 67/14 709/204 |
| 2005/0039116 A1* | 2/2005 | Slack-Smith ........... G06F 17/24 715/255 |
| 2005/0097440 A1 | 5/2005 | Lusk et al. |
| 2005/0130110 A1 | 6/2005 | Gosling |
| 2005/0144232 A1 | 6/2005 | Estrada et al. |
| 2005/0182773 A1* | 8/2005 | Feinsmith ................. 707/100 |
| 2005/0266387 A1 | 12/2005 | Rossides |
| 2006/0121434 A1 | 6/2006 | Azar |
| 2006/0286530 A1 | 12/2006 | Forrest et al. |
| 2007/0094601 A1 | 4/2007 | Greenberg et al. |
| 2007/0099162 A1 | 5/2007 | Sekhar |

OTHER PUBLICATIONS

Notice of Allowance (dated Sep. 16, 2013) for U.S. Appl. No. 11/366,517, filed Mar. 2, 2006, First Named Inventor Vivek Sekhar, Confirmation No. 4308.

Non-Final Rejection (dated Mar. 29, 2013) for U.S. Appl. No. 11/366,517, filed Mar. 2, 2006, First Named Inventor Vivek Sekhar, Confirmation No. 4308.

Final Rejection (dated Apr. 13, 2011) for U.S. Appl. No. 11/366,517, filed Mar. 2, 2006, First Named Inventor Vivek Sekhar, Confirmation No. 4308.

Non-Final Rejection (dated Oct. 1, 2010) for U.S. Appl. No. 11/366,517, filed Mar. 2, 2006, First Named Inventor Vivek Sekhar, Confirmation No. 4308.

Non-Final Rejection (dated Mar. 30, 2010) for U.S. Appl. No. 11/366,517, filed Mar. 2, 2006, First Named Inventor Vivek Sekhar, Confirmation No. 4308.

Final Rejection (dated Dec. 7, 2009) for U.S. Appl. No. 11/366,517, filed Mar. 2, 2006, First Named Inventor Vivek Sekhar, Confirmation No. 4308.

Non-Final Rejection (dated May 28, 2009) for U.S. Appl. No. 11/366,517, filed Mar. 2, 2006, First Named Inventor Vivek Sekhar, Confirmation No. 4308.

U.S. Appl. No. 11/583,657.

* cited by examiner

FIG. 4B

Citizen Engagement – Ontario e-Town Hall

Solutions and criteria for getting people involved in Ontario's democratic institutions

Wiki Doc

Document Commentators:
- Bob Summermen
- Jane Templeton
- John Dorian
- William K.R. Smith Outline | Background | Search

Document Outline
- Introduction
- Democratic Values
- Ontario's Voting System
- Ontario-STV
- Ontario-MMP
- Ontario-PR
- Choosing a System
- BC's Experience
- New Zealand's Experience
- Plan for Ontario
- Possible Dates
- Conclusion
- Appendix A: Citizens' Comments

Editing: BC's Experience

For most of our history this province has used a "single member plurality" electoral system, popularly referred to as "First-Past-the-Post" (FPTP). The first candidate to cross the finish line—the one with the most votes—wins the seat and represents the local district in the legislature. Governments are formed by the party with the most seats. It is a simple system.

Supporters of FPTP typically argue for its ability to produce majority governments, often cautioning against the unequal power small parties might exercise in coalition or minority governments. Governments with a legislative majority may claim a mandate for action. They do not have to bargain with other parties to act on their policies, but can plan and take the administrative and financial decisions necessary to implement their program. Similarly, at election time, voters know who is responsible for the government's successes or failures and can clearly indicate which party they wish to govern the province.

This tendency toward majority government is FPTP's most important feature: without it, British Columbia would not have had majority governments throughout much of its recent history. In fact, British Columbians have only rarely given one party a majority of their votes.

A basic principle of FPTP is local representation—every corner of the province is represented in the legislature.

Please make your changes below and click 'Submit Changes'.

For most of our history this province has used a "single member plurality" electoral system, popularly referred to as "First-Past-the-Post" (FPTP). The first candidate to cross the finish line—the one with the most votes—wins the seat and represents the local district in the legislature. Governments are formed by the party with the most seats. It is a simple system.

Supporters of FPTP typically argue for its ability to produce majority governments, often cautioning against the unequal power small parties might exercise in coalition or minority governments. Governments with a legislative majority may claim a mandate for action. They do not have to bargain with other parties to act on their policies, but can plan and take the administrative and financial decisions necessary to implement their program. Similarly, at election time, voters know who is responsible for the government's successes

[Submit Changes]

SYSTEMS, METHODS AND TOOLS FOR FACILITATING GROUP COLLABORATIONS

PRIORITY CLAIM

This application claims priority to U.S. application Ser. No. 11/583,657, filed on Oct. 19, 2006, and entitled "Systems, Methods and Tools for Facilitating Group Collaborations," which claims priority to Canadian Patent Application Serial Number 2,524,527, filed Oct. 26, 2005," the entire disclosures of which are incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The present invention relates to systems, methods and tools for facilitating group collaborations.

Technology-assisted group collaborations are now commonplace: many types of tools have been created to support and to expand upon the scope of what can be accomplished between geographically dispersed participants. Some of these tools include, for example, Internet Relay Chat (IRC), message boards, online polls, and collaborative document creation and review. While these tools may represent advances over what existed before, they may nevertheless exhibit certain limitations when used in collaborative efforts involving a large number of people. Improved systems, methods and tools for facilitating group collaborations are needed.

SUMMARY

The present invention relates to systems, method and tools for facilitating group collaborations.

Collaborative ideas collected from a group are organized into an extendable hierarchical data structure. In a preferred embodiment, collaborative ideas are represented in a modified tree data structure in which ideas are stored in nodes of the tree (an "idea tree"). Each node may be associated with data storage means, such as a table of records, in which different kinds of data can be stored. Data stored in the idea tree, or a part thereof, may be created, modified, deleted or organized by using various types of collaboration tools. A participant's interaction with the idea tree, or a part thereof, using a particular collaboration tool may be mapped as a transformation of the idea tree from one state to another. Other participants may simultaneously or successively interact with the idea tree, or a part thereof, using the same or a different collaboration tool. A coherent representation of collaborative ideas can be developed and organized without excessive manual effort.

In an aspect of the invention, there is provided a data processing system implemented method of facilitating group collaborations on a project by a plurality of participants, comprising: providing an extendable hierarchical data structure, the hierarchical data structure including data storage means for storing a plurality of data items submitted by the participants; providing a collaboration tool for use by the participants to work with the hierarchical data structure, the collaboration tool being configured to logically link to a defined workspace on the hierarchical data structure in which the tool is to be used, the collaboration tool being further configured to work with data items in the workspace associated with the collaboration tool.

In an embodiment, the method further comprises: providing a tree data structure as the hierarchical data structure, the tree data structure having a root node and one or more sub-nodes branching from the root node, each node being associated with a data storage means configured to store a plurality of heterogeneous data items; and logically linking a collaboration tool to a link node in the tree data structure, the link node and any sub-nodes defining the workspace on the tree data structure for the collaboration tool.

In another embodiment, the method further comprises logically linking multiple collaboration tools to different link nodes of the tree data structure to define multiple workspaces, whereby participants may work on different parts of the tree data structure simultaneously.

In another embodiment, the method further comprises successively logically linking different collaboration tools to link nodes of the tree data structure, whereby the resulting workflow simulates a group collaboration process involving a sequential progression.

In yet another embodiment, the method further comprises saving the state of the tree data structure after each transformation of the tree data structure applied by a collaboration tool, whereby a previous state of the tree data structure may be recovered.

In still another embodiment, the method further comprises configuring a collaboration tool to utilize the output of another collaboration tool, the output of each collaboration tool being reflected as a transformation of the tree data structure.

In another embodiment, the method further comprises providing a collaboration tool for linking to a link node of the tree data structure, and collecting a plurality of homogeneous data items from the defined workspace.

In another embodiment, the plurality of homogeneous data items comprise text associated with the workspace and submitted by the participants, and the method further comprises forming a document from the collected text.

In another embodiment, the method further comprises modifying the document formed from the collected text, and amending the corresponding data items in the tree data structure to correspond to the modified document.

In still another embodiment, the plurality of homogeneous data items comprise images associated with the workspace and submitted by the participants, and the method further comprises forming a slideshow of the collected images.

In another aspect of the invention, there is provided a data processing system for facilitating group collaborations on a project by a plurality of participants, comprising: means for providing an extendable hierarchical data structure, the hierarchical data structure including data storage means for storing a plurality of data items submitted by the participants; and means for providing a collaboration tool for use by the participants to work with the hierarchical data structure, the collaboration tool being configured to logically link to a defined workspace on the hierarchical data structure in which the tool is to be used, the collaboration tool being further configured to work with data items in the workspace associated with the collaboration tool.

In an embodiment, the hierarchical data structure is a tree data structure, the tree data structure having a root node and one or more sub-nodes branching from the root node, each node being associated with a data storage means configured to store a plurality of heterogeneous data items; and the data processing system further includes means for logically linking a collaboration tool to a link node in the tree data structure, the link node and any sub-nodes defining the workspace on the tree data structure for the collaboration tool.

In another embodiment, the system further comprises means for logically linking multiple collaboration tools to different link nodes of the tree data structure to define multiple workspaces, whereby participants may work on different parts of the tree data structure simultaneously.

In another embodiment, the system further comprises means for successively logically linking different collaboration tools to link nodes of the tree data structure, whereby the resulting workflow simulates a group collaboration process involving a sequential progression.

In another embodiment, the system further comprises means for saving the state of the tree data structure after each transformation of the tree data structure applied by a collaboration tool, whereby a previous state of the tree data structure may be recovered.

In yet another embodiment, the system further comprises means for configuring a collaboration tool to utilize the output of another collaboration tool, the output of each collaboration tool being reflected as a transformation of the tree data structure.

In another embodiment, the system further comprises means for providing a collaboration tool for linking to a link node of the tree data structure, and collecting a plurality of homogeneous data items from the defined workspace.

In still another embodiment, the plurality of homogeneous data items comprise text associated with the workspace and submitted by the participants, and the data processing system further includes means for forming a document from the collected text.

In another embodiment, the system further comprises means for modifying the document formed from the collected text, and amending the corresponding data items in the tree data structure to correspond to the modified document.

In another embodiment, the plurality of homogeneous data items comprise images associated with the workspace and submitted by the participants, and the data processing system further includes means for forming a slideshow of the collected images.

In another aspect of the invention, there is provided a data processor readable medium storing data processor code that, when loaded into a data processing device, adapts the device to facilitate group collaborations on a project, the data processor readable medium including: code for providing an extendable hierarchical data structure, the hierarchical data structure including data storage means for storing a plurality of data items submitted by the participants; and code for providing a collaboration tool for use by the participants to work with the hierarchical data structure, the collaboration tool being configured to logically link to a defined workspace on the hierarchical data structure in which the tool is to be used, the collaboration tool being further configured to work with data items in the workspace associated with the collaboration tool.

In another embodiment, the data processor readable medium further includes: code for defining the hierarchical data structure as a tree data structure, the tree data structure having a root node and one or more sub-nodes branching from the root node, each node being associated with a data storage means configured to store a plurality of heterogeneous data items; and code for logically linking a collaboration tool to a link node in the tree data structure, the link node and any sub-nodes defining the workspace on the tree data structure for the collaboration tool.

In another embodiment, the data processor readable medium further includes code for logically linking multiple collaboration tools to different link nodes of the tree data structure to define multiple workspaces, whereby participants may work on different parts of the tree data structure simultaneously.

In another embodiment, the data processor readable medium further includes code for successively logically linking different collaboration tools to link nodes of the tree data structure, whereby the resulting workflow simulates a group collaboration process involving a sequential progression.

In another embodiment, the data processor readable medium further includes code for saving the state of the tree data structure after each transformation of the tree data structure applied by a collaboration tool, whereby a previous state of the tree data structure may be recovered.

In another embodiment, the data processor readable medium further includes code for configuring a collaboration tool to utilize the output of another collaboration tool, the output of each collaboration tool being reflected as a transformation of the tree data structure.

In another embodiment, the data processor readable medium further includes code for providing a collaboration tool for linking to a link node of the tree data structure, and collecting a plurality of homogeneous data items from the defined workspace.

In yet another embodiment, the plurality of homogeneous data items comprise text associated with the workspace and submitted by the participants, and the data processor readable medium further includes code for forming a document from the collected text.

In another embodiment, the data processor readable medium further includes code for modifying the document formed from the collected text, and amending the corresponding data items in the tree data structure to correspond to the modified document.

In still another embodiment, the plurality of homogeneous data items comprise images associated with the workspace and submitted by the participants, and the data processor readable medium further includes code for forming a slideshow of the collected images.

These and other aspects of the invention will become apparent from the following more particular descriptions of exemplary embodiments.

BRIEF DESCRIPTION OF THE DRAWINGS

In the figures which illustrate exemplary embodiments of the invention:

FIG. 4B shows an illustrative screen capture of a categorizer tool.

FIG. 4C shows an illustrative screen capture of a collaborative document editing tool.

FIG. 4E shows an illustrative screen capture of a document commenting tool.

FIG. 4F shows an illustrative screen capture of a ranking tool.

FIG. 4G shows an illustrative screen capture of a solution matrix tool.

DETAILED DESCRIPTION

As noted above, the present invention relates to systems, methods and tools for group collaborations.

Figure 1:
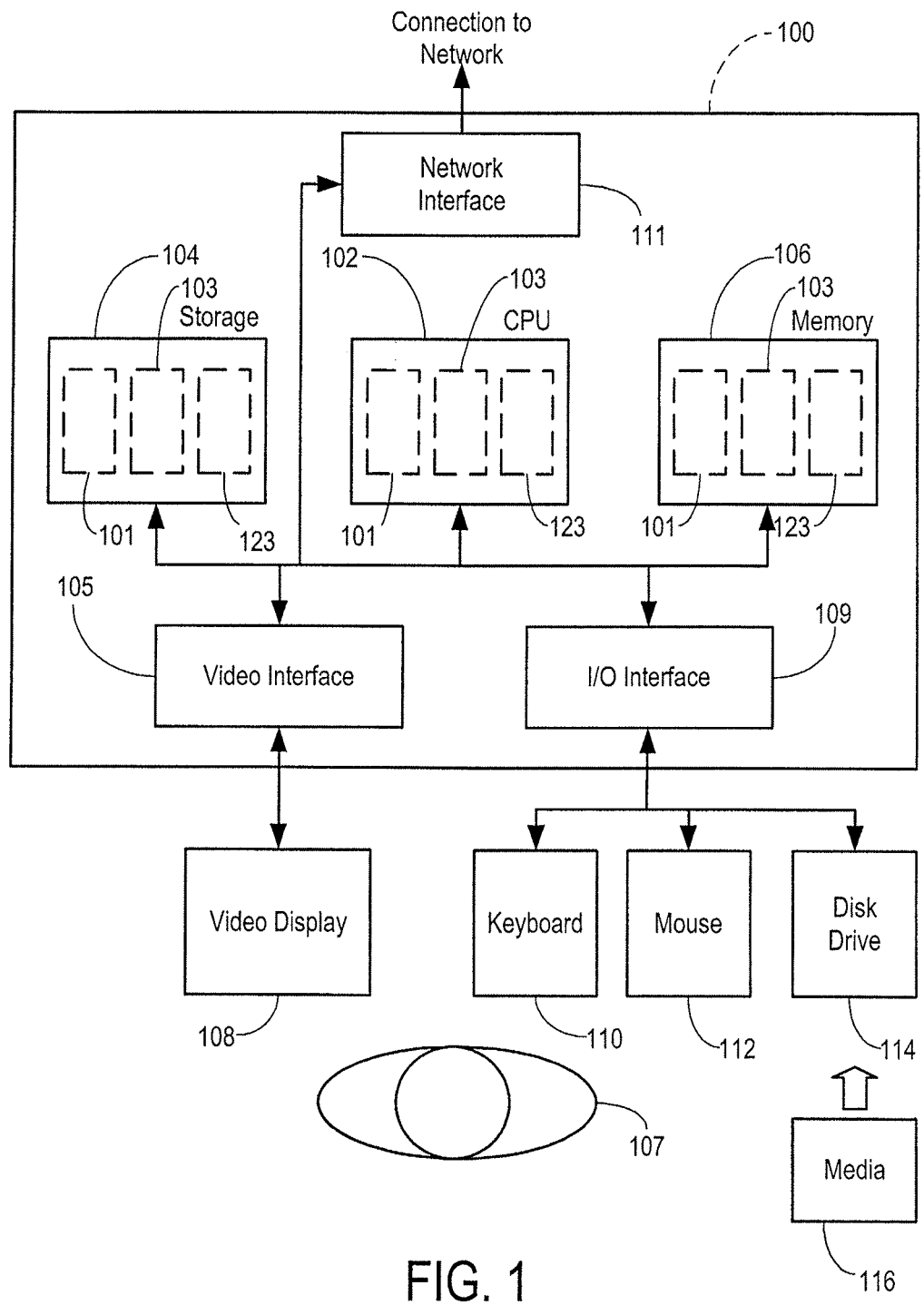
FIG. 1 shows a generic data processing system that may provide a suitable operating environment.

The invention may be practiced in various embodiments. A suitably configured data processing system, and associated communications networks, devices, software and firmware may be provided to provide a platform for enabling one or more of these systems, methods, and tools. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface ("GUI") controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown). The particular configurations shown by way of example in this specification are not meant to be limiting.

Figure 2A:
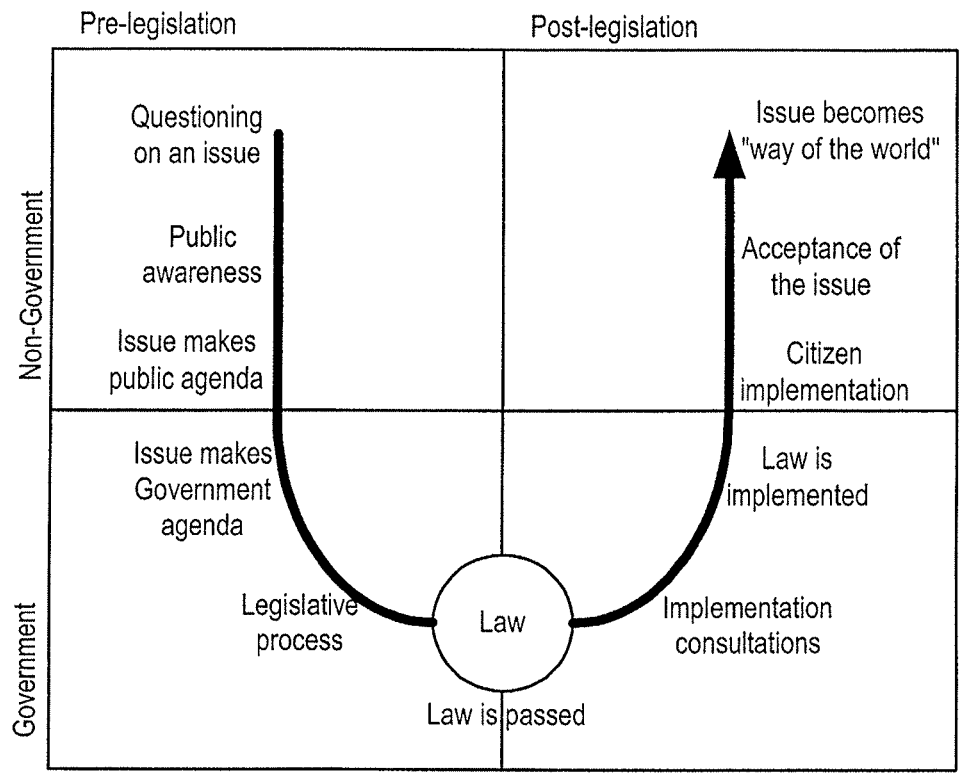
FIG. 2A and FIG. 2B show an illustrative framework for policy development.

Many types of group collaboration projects may be facilitated by the present invention. By way of illustration, one such group collaboration project may involve citizen engagement in a public policy making process. In FIG. 2A, shown is a typical policy making framework representing a timeline from the original idea to long-term implementation. In this framework, the timeline is partitioned into four quadrants, with the top two quadrants representing citizen-led actions, and the bottom two quadrants representing government-led actions. The left side quadrants represent pre-legislative events, while the right side quadrants represent post-legislative events. Within this policy making framework, citizens may introduce, debate and question a policy, and depending on the input and feedback, the government may decide whether or not to implement the policy through a legislative process.

Figure 2B:
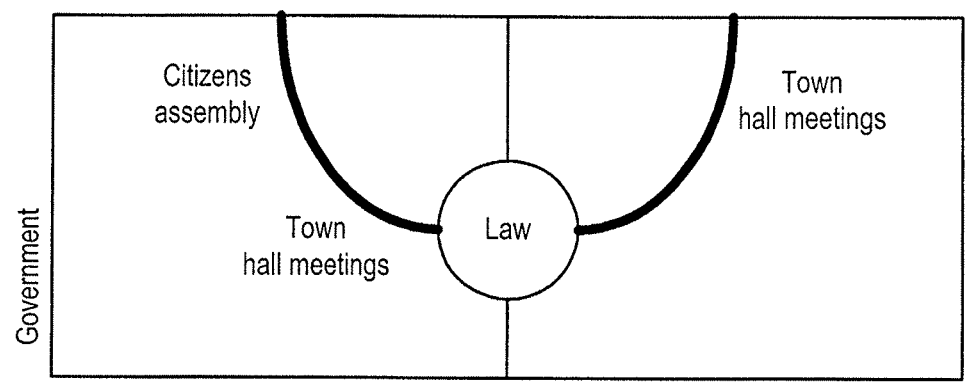

As shown in FIG. 2B, in the bottom half of the framework, government-led initiatives such as town hall meetings, citizens' assemblies, and citizens' juries may provide a forum for input from citizens. However, these citizens' juries and town hall meetings may tend to provide only a limited opportunity for citizen participation. They may not allow the government to take advantage of a full range of input and opinions from a more representative sample of the voting population. This illustrative example demonstrates a need for facilitating large-scale group collaborations that may be met by the present invention.

As will now be explained, a solution for facilitating large-scale group collaboration may include the following: (i) a system and data architecture that allows for the flexible storage, retrieval and manipulation of ideas presented in a variety of forms and formats; and (ii) a collaboration toolkit that enables flexible application of a variety of transformations on the system and data architecture.

The collaboration toolkit, as developed and envisioned by the inventors, provides a set of tools to assist participants and moderators in the process of brainstorming, discussing, and compiling the participants' contributions into a structured and meaningful output. As will be explained in more detail further below, a notable feature of the collaboration toolkit is that tools may be applied to different parts of the data structure at the same time. The tools may also be sequenced for use on the data structure in any order, allowing for the creation of flexible, customized workflows to model virtually any type of collaborative process. Tasks may be split into manageable portions, and contributions from many participants may be integrated into a unified whole. To enable this flexibility, the collaboration toolkit should be used with a data structure that is extensible, flexibly structured, and resilient to error. Given this criteria, the data structure preferred by the inventors is a hierarchical data structure capable of storing heterogeneous data items, and more preferably a modified tree data structure referred to herein as an "idea tree" and as described below.

The Idea Tree

Figure 3A:
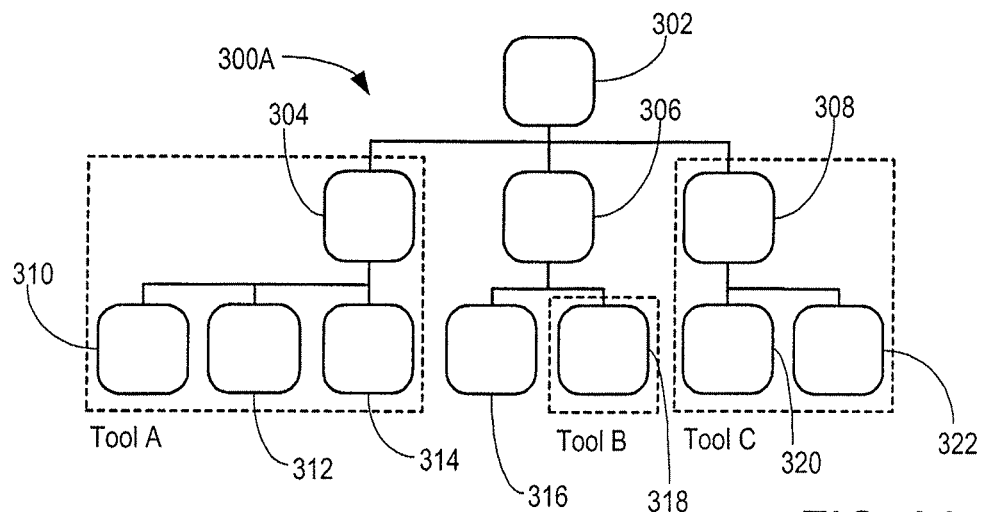
FIG. 3A and FIG. 3B show illustrative schematic views of an idea tree.

The inventors have selected a tree data structure as illustrated in FIG. 3A, as being well suited for facilitating large-scale collaborations as in the public policy development example introduced above.

As illustrated in FIG. 3A, each "idea tree" 300A starts as a single node, called the root node 302. Using one of the tools in the collaboration toolkit, related ideas or sub-ideas may be added to the idea tree by creating and adding suitable child nodes 304, 306, 308 connected to the root node 302. Each of the sibling nodes 304, 306, 308 may be a parent node having their own child nodes (e.g. parent node 304 has child nodes 310, 312, 314; parent node 306 has child nodes 316, 318; parent node 308 has child nodes 320, 322). Each node in the idea tree may have virtually an unlimited number of child nodes representing sub-ideas, or comments related to the idea expressed in the parent node. As shown in FIG. 3A, a sub-tree of the idea tree may itself be an intact idea tree. This structural self-similarity may permit large-scale collaborations on potentially very broad topics, and may allow multiple collaboration tools to be used on different parts of the idea tree simultaneously. This is illustrated in FIG. 3A where three tools—"Tool A", "Tool B", and "Tool C"—are shown acting on different parts of the idea tree 300A. Each of these tools is logically linked to a particular node, and may act upon a "workspace" including the link node and its sub-nodes.

Figure 3B:
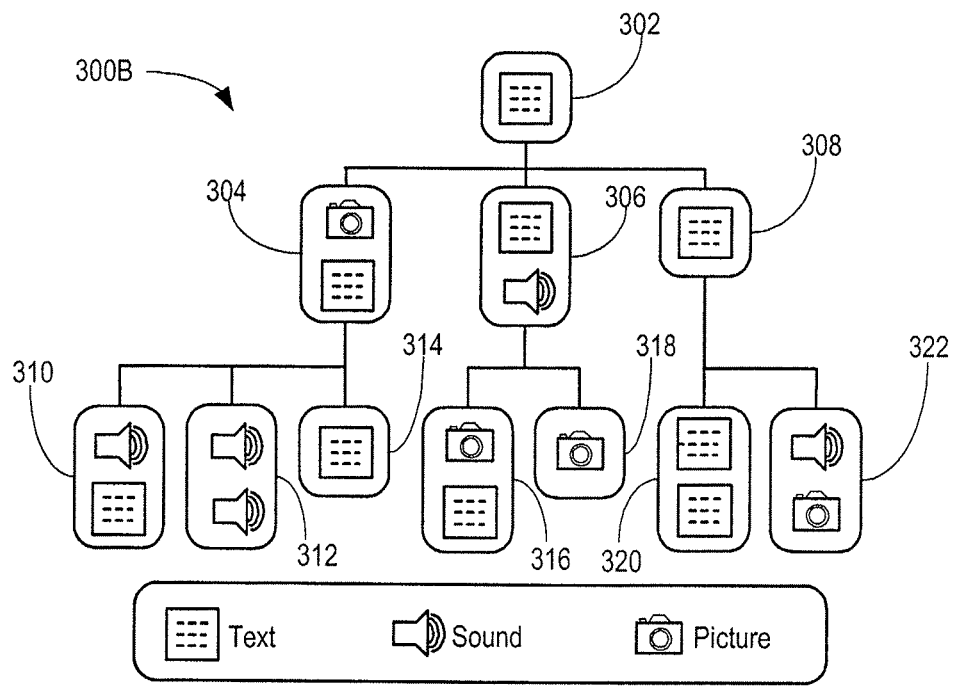
Figure 3C:
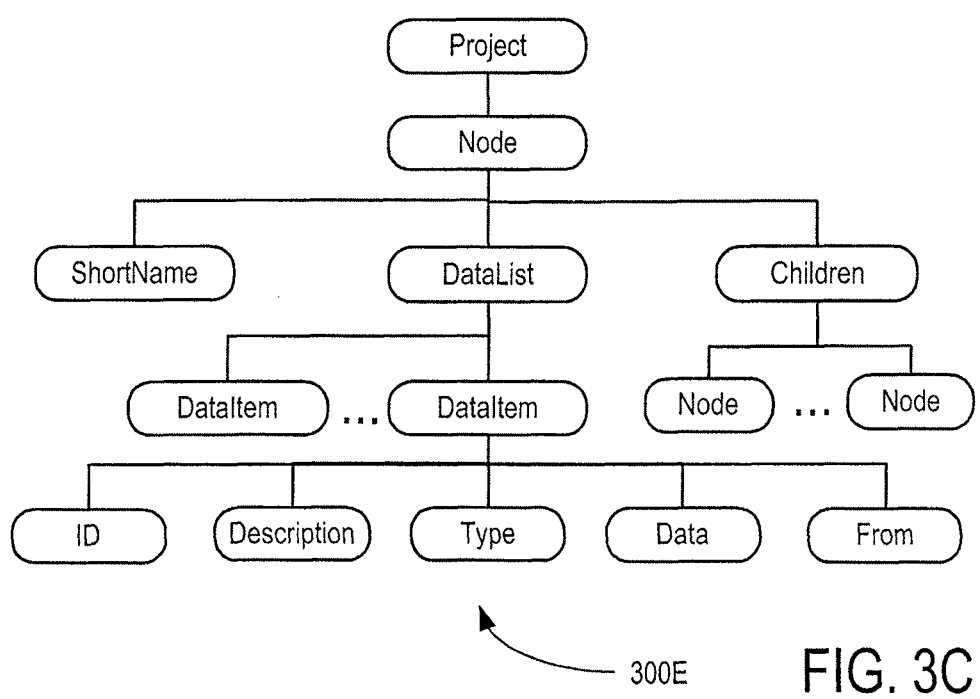
FIG. 3C shows an illustrative data schema for the idea tree of FIG. 3A and FIG. 3B.

As shown in FIG. 3B, the data storage means associated with each node of the idea tree 300B may store different forms of structured data. As an example, the data storage means associated with each node of idea tree 300B may comprise a table or database having a plurality of records for containing different types of data or information related to a particular node. Each table may be configured to store in its records heterogeneous data items, such as text, sounds, pictures, and various types of information relating to the content or structure of idea tree 300B (e.g. comments on or responses to proposed ideas posted in the form of video clips, texts or sound recordings; results of ratings collected in response to a prompt to rate an idea; hierarchical references to parent nodes and child nodes, etc.).

The data architecture of idea tree 300B may offer considerable flexibility in allowing each collaborative tool to store and to retrieve only the specific pieces of data or information required by the tool, and to ignore the rest. For example, Tool A having a workspace including nodes 304, 310, 312 and 314 may be configured to work only with text data, in which case only the text data in nodes 304, 310 and 314 may be retrieved and used by Tool A. Sound data or picture data in nodes 304, 310, 312, 314 may be ignored by Tool A. As another example, Tool B might be a slideshow tool having a workspace including node 318, and which processes images retrieved from node 318. As yet another example, if this slideshow tool was being used on multiple nodes, the slideshow tool may use ranking information associated with image data stored in the multiple nodes to create a slideshow of images in a ranked order. More examples of tools that may be used on the idea tree are provided further below.

In order to provide data resiliency, the idea tree 300A, 300B may allow any transformation operation performed on the tree to be undone, either by performing one or more reverse transformation operations (for example, by moving an erroneously placed idea to a previous node in the tree), or by allowing the idea tree to revert back to a previously saved state.

The idea tree may be implemented using one of any number of different application development tools and languages. For example, in an Internet-based application development context, the idea tree may be defined using Extensible Markup Language ("XML"). Due to its inherent hierarchical nature, the inventors have found XML to be well suited for defining the idea tree.

In an illustrative example, each node of the idea tree may have a number of defined elements, including a Short Name, Data List, and Children, as listed below in Table A.

TABLE A

| Elements | Description |
| --- | --- |
| Short Name | A textual description of the node. |
| Data List | Collection of DataItems in the node. |
| Children | List of child nodes connected to this node. |

As well, each DataItem stored on each node may contain a number of pieces of information as shown below in Table B.

TABLE B

| Information | Description |
| --- | --- |
| ID | A short name that uniquely identifies a piece of information in the node. |
| Description | A longer, human readable identifier for a piece of information. |
| Type | Data type of the DataItem (string, integer, rank, etc.) |
| Data | The data for this DataItem. |
| From | The tool from which this data was created. |

A graphic representation of an illustrative XML schema is shown in FIG. 3E, and a corresponding language version of this XML schema is presented below.

```
<?xml version="1.0" encoding="UTF-8"?>
<xs:schema xmlns:xs="http://www.w3.org/2001/XMLSchema" elementFormDefault="qualified"
attributeFormDefault="unqualified">
    <xs:element name="Project">
        <xs:annotation>
            <xs:documentation>An alltogether Toolkit Project - Stores the entire Idea
            Tree</xs:documentation>
        </xs:annotation>
        <xs:complexType>
            <xs:sequence>
                <xs:element name="Node">
                    <xs:annotation>
                        <xs:documentation>A single node in the idea tree.</xs:documentation>
                    </xs:annotation>
                    <xs:complexType>
                        <xs:sequence>
                            <xs:element name="ShortName" nillable="false">
                                <xs:annotation>
                                    <xs:documentation>A short text description of the data within this
                                    node.</xs:documentation>
                                </xs:annotation>
                                <xs:simpleType>
                                    <xs:restriction base="xs:string">
                                        <xs:minLength value="1"/>
                                    </xs:restriction>
                                </xs:simpleType>
                            </xs:element>
                            <xs:element name="DataList">
                                <xs:annotation>
                                    <xs:documentation>A list of all data within this node.
                                    </xs:documentation>
                                </xs:annotation>
                                <xs:complexType>
                                    <xs:sequence>
```

```
                <xs:element name="DataItem" minOccurs="0"
          maxOccurs="unbounded">
                    <xs:annotation>
                        <xs:documentation>A single piece of data within the
                        node.</xs:documentation>
                    </xs:annotation>
                    <xs:complexType>
                        <xs:sequence>
                            <xs:element name="ID" nillable="false">
                                <xs:annotation>
                                    <xs:documentation>A short textual id of
                        the node. This field must be unique
          within a DataList.</xs:documentation>
                                </xs:annotation>
                                <xs:simpleType>
                                    <xs:restriction base="xs:token">
                                        <xs:minLength value="1"/>
                                    </xs:restriction>
                                </xs:simpleType>
                            </xs:element>
                            <xs:element name="Description" nillable="false">
                                <xs:annotation>
                                    <xs:documentation>A human-
                                    understandable description
                                    of the data stored in the
                                    DataItem.</xs:documentation>
                                </xs:annotation>
                                <xs:simpleType>
                                    <xs:restriction base="xs:string">
                                        <xs:minLength value="1"/>
                                    </xs:restriction>
                                </xs:simpleType>
                            </xs:element>
                            <xs:element name="Type">
                                <xs:annotation>
                                    <xs:documentation>The type of data
                                    stored in this DataItem. (E.g. String,
                                    Rank, Number)</xs:documentation>
                                </xs:annotation>
                                <xs:simpleType>
                                    <xs:restriction base="xs:token">
                                        <xs:minLength value="1"/>
                                    </xs:restriction>
                                </xs:simpleType>
                            </xs:element>
                            <xs:element name="Data" nillable="false">
                                <xs:annotation>
                                    <xs:documentation>The actual
                                    data.</xs:documentation>
                                </xs:annotation>
                                <xs:simpleType>
                                    <xs:restriction base="xs:string">
                                        <xs:minLength value="1"/>
                                    </xs:restriction>
                                </xs:simpleType>
                            </xs:element>
                            <xs:element name="From">
                                <xs:annotation>
                                    <xs:documentation>Which tool this data
                                    came from.</xs:documentation>
                                </xs:annotation>
                                <xs:simpleType>
                                    <xs:restriction base="xs:string">
                                        <xs:minLength value="1"/>
                                    </xs:restriction>
                                </xs:simpleType>
                            </xs:element>
                        </xs:sequence>
                    </xs:complexType>
                </xs:element>
            </xs:sequence>
        </xs:complexType>
    </xs:element>
    <xs:element name="Children">
        <xs:annotation>
            <xs:documentation>A list of all children of this
            node.</xs:documentation>
        </xs:annotation>
```

```
                <xs:complexType>
                    <xs:sequence>
                        <xs:element ref="Node" minOccurs="0"
                            maxOccurs="unbounded"/>
                    </xs:sequence>
                </xs:complexType>
            </xs:element>
        </xs:sequence>
    </xs:complexType>
    </xs:element>
  </xs:sequence>
 </xs:complexType>
</xs:element>
<xs:element name="Node"/>
</xs:schema>
```

Although the above illustrative XML schema may be suitable for many different kinds of applications, it will be appreciated that the XML schema may be adapted as may be necessary (e.g. to allow for other elements or information descriptors).

The Collaboration Toolkit

Brief examples of tools that may be used to work on the idea tree were provided earlier. Further examples of tools are now provided.

Generally speaking, the collaboration toolkit may include both participant collaboration tools and moderator tools. In an embodiment, in order to maintain a desired degree of control over the growth of the idea tree, additions and modifications to the idea tree proposed by participants using one of the collaboration tools may be queued, and only applied by a moderator as a transformation on the idea tree at appropriately determined times. Moderator tools, on the other hand, may allow changes to take effect immediately.

In an Internet-based implementation, the collaboration tools may be set up by the moderator and made available on a project's website. An illustrative information technology (IT) architecture is described further below. Participants can enter the website and participate in the group collaboration project using one or more of the available tools. Examples of some collaboration tools are now described:

(a) Brainstorm Chat Tool

Figure 4A:
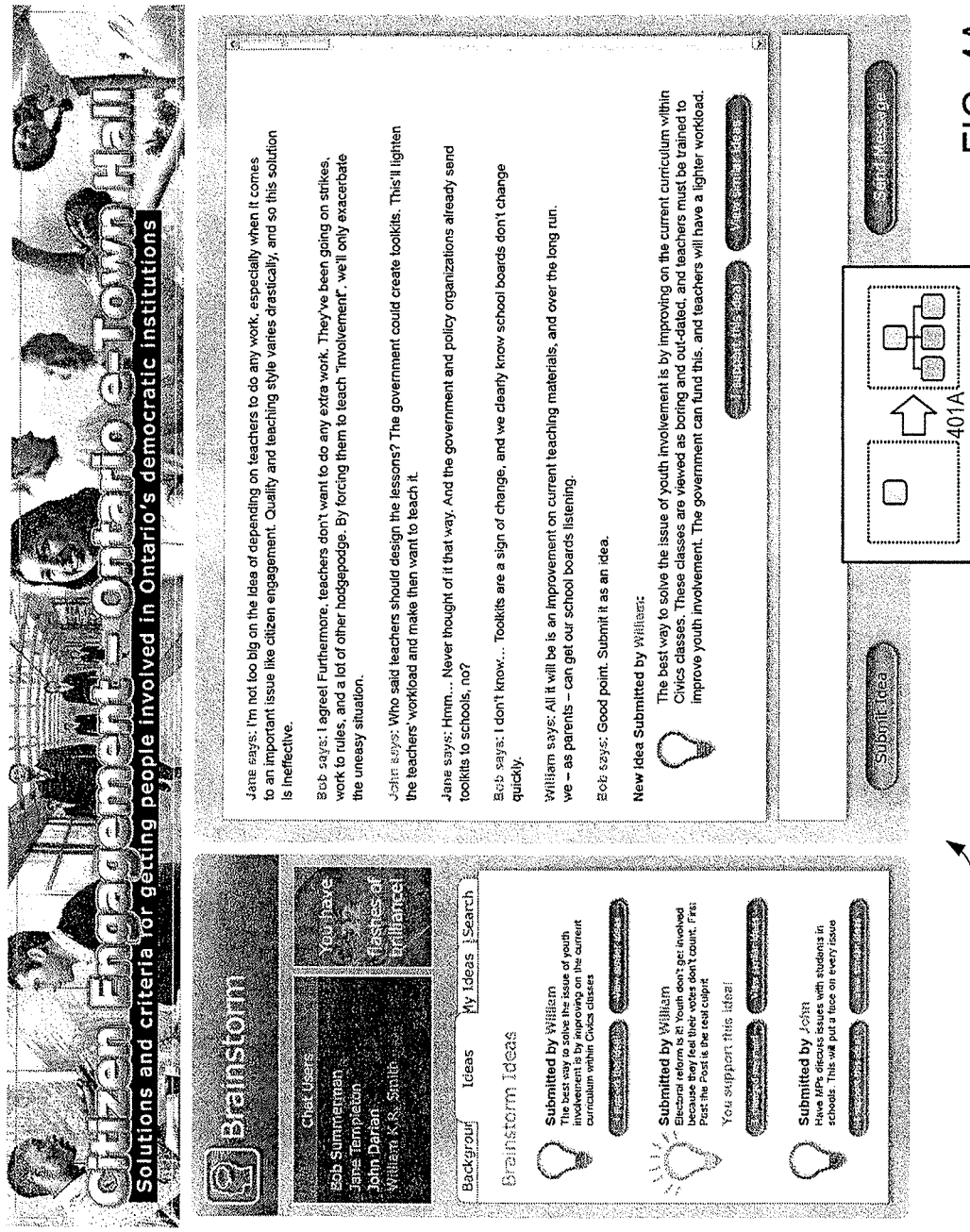
FIG. 4A shows an illustrative screen capture of a brainstorm chat tool.

Shown in FIG. 4A is a sample screen capture 400A of an illustrative "brainstorm chat" tool interface. A corresponding transformation of the idea tree that may be effected by this brainstorm chat tool is represented graphically at 401A. This brainstorm chat tool may facilitate a brainstorming session by encouraging participants to submit new ideas about a problem or an issue being discussed.

When a brainstorm chat session begins, the corresponding brainstorm chat tool may be logically linked to an appropriate node in the idea tree that best represents the desired scope of the brainstorm. The node to which the tool is linked may semantically form the "topic" or "seed" for the discussion/brainstorm. In addition to submitting comments on ideas offered by others, participants can also submit their own new ideas. These new ideas may be added to the idea tree as child nodes to a node to which the brainstorm chat tool is logically linked. This brainstorm chat tool could permit a group to brainstorm solutions to a problem, propose new initiatives, or suggest changes. Participants' contributions are thus used to build the idea tree and become part of the collective store of knowledge in the idea tree.

In an embodiment, every participant can promote an idea by supporting it (e.g., by clicking a button associated with the idea). The number of votes of confidence received for an idea may be tallied, so that the submitter of the idea can see how well the idea is accepted by other participants.

In terms of implementation, as an illustrative example, this brainstorm chat tool may be configured as a web-based online chat interface using IRC, or other instant messaging protocols. The brainstorm chat tool could also be extended to interfaces for mobile devices, such as SMS. This may allow for many different access points for participation. For example, a brainstorming session or event could be held over the course of a few days or weeks, and the public may be alerted via billboards, print media, radio or television to submit their suggestions for solving a problem by sending an e-mail to a certain address, or a text message to a certain phone number. A server may then add the ideas received to the idea tree on a website.

(b) Categorizer Tool

Figure 4B:
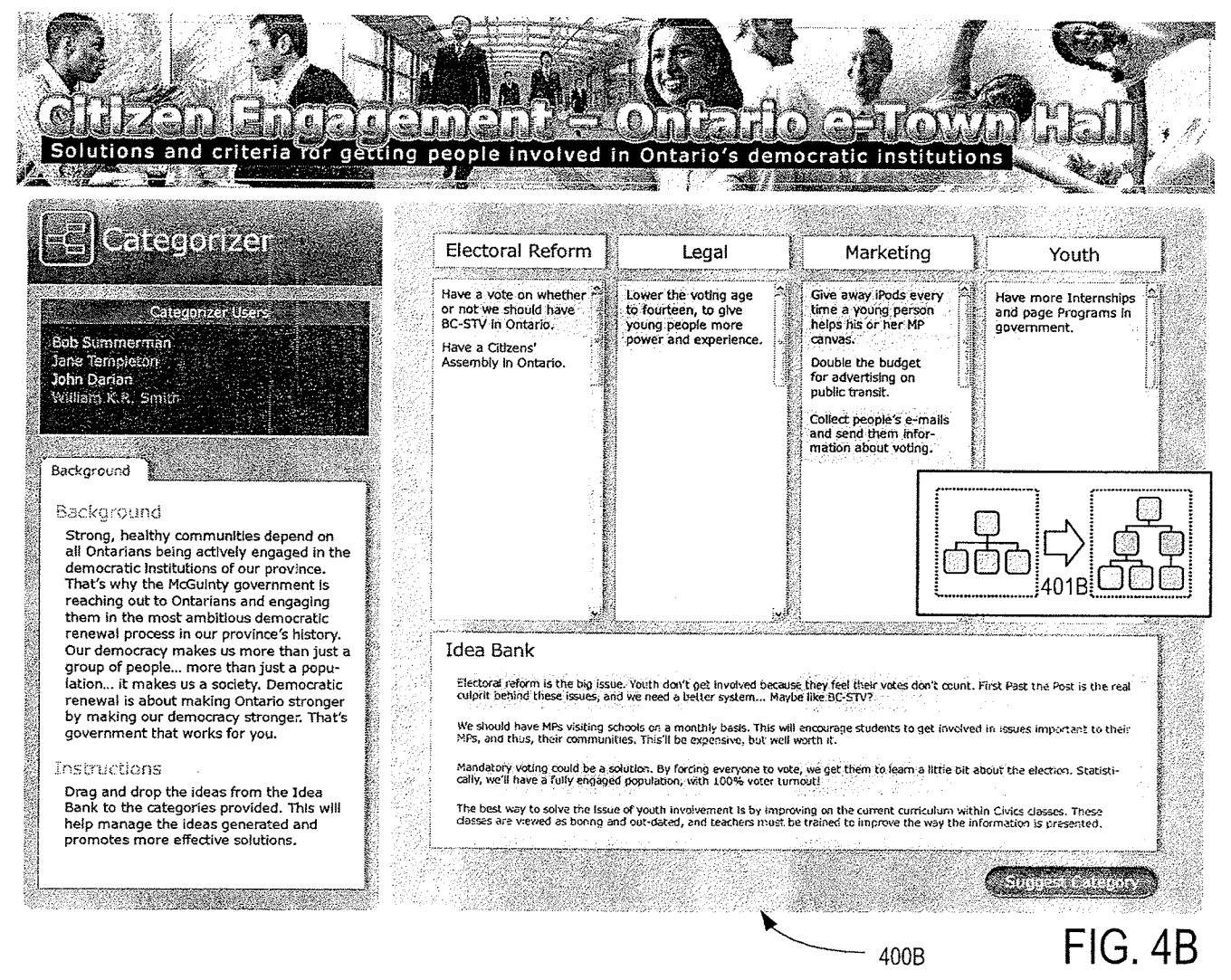

Shown in FIG. 4B is a sample screen capture 400B of an illustrative categorizer tool interface. A corresponding transformation of the idea tree applied by the categorizer tool is shown at 401B. As shown, the categorizer tool may have the effect of changing the structure of the idea tree.

Ideas may come in all forms, and may cover a wide range of issues within a topic. A free-form public brainstorming session, such as may be facilitated using the brainstorm chat tool described above, could result in perhaps many hundreds or thousands of ideas. What is needed is a way of bringing order and structure to the pool of knowledge without subjecting any individual to the onerous task of reviewing the entire collection of ideas.

This categorizer tool may permit a group of participants to contribute to the task of categorizing a large collection of ideas. Each participant may be shown a relatively small number of ideas and asked to place them in categories based on their views of how the ideas are related. The preferred participant categorizations may be tabulated as votes, and based on a statistical model, other ideas may be presented to participants as they progress through the categorization operation. The inputs from the participants can then be aggregated such that the overall result of the categorization is statistically representative of the entire group. If a participant feels that none of the predefined categories fit, the participant may also submit a new category for review and possible inclusion by a moderator.

In an embodiment, a moderator may set up operation of this categorizer tool by selecting the ideas to be categorized, and providing an initial list of possible categories. The categorizer tool may create new nodes that are populated with the categories, and may move the ideas under these category nodes according to the group's overall categorization preference, as statistically determined by their categorization choices.

Like the Brainstorm chat tool described above, the categorizer tool may be logically linked to a particular node. In this case, the categories may be inserted as child nodes to the link node, and any nodes being categorized may get moved under the category nodes as child nodes, as they are categorized by the group.

(c) Collaborative Document Editing Tool

Shown in FIG. 4C is a sample screen capture 400C of a collaborative document editing tool. A corresponding transformation that may be applied to the idea tree by this tool is shown at 401C. This collaborative document editing tool may be used to access and search through a document, and to submit proposed changes and edits.

In an embodiment, while the proposed changes and edits may immediately be made available for viewing, a moderator may moderate the proposed changes and edits as may be necessary to maintain organization of the idea tree. Since this collaborative document editing tool may allow people to work on different parts of the idea tree asynchronously, it is highly scalable, and allows for a large number of participants to contribute to the idea tree at the same time. The only practical limitation may be the capacity of a moderator to review and approve proposed edits and changes if that is desired, although multiple moderators may be used in this case if the capacity so demands.

As with other tools in the collaboration toolkit, the collaborative document editing tool may be logically linked to a specific node and its child nodes, and access only the relevant collaborative document editing tool related data stored in the selected portion of the idea tree. The collaborative document editing tool may be configured to create or modify an appropriate text entry stored in each node, as the moderator accepts the comments made by participants.

In terms of implementation, in an illustrative Internet-based XML schema example, memo-type DataItems may be used to store free-form text in each node. In an embodiment, each node may be configured to contain the information necessary to adequately describe its semantic content. A tool can then assemble the text from each node to produce a document. If a collective ranking is associated with each text entry, the text may be presented in the produced document in a ranked order.

The document can be edited by participants, and the changes may subsequently be translated to a transformation of the idea tree. For example, changing a paragraph of text would modify the memo-text DataItem entry in the appropriate node. Also, reordering the text may update the relative ranking of the nodes.

This collaborative document editing tool permits multi-user manipulations of a document by automatically segmenting the document according to its underlying semantic structure, as specified by the idea tree.

(d) Real-Time Collaborative Document Editing Tool

Figure 4D:
FIG. 4D shows an illustrative screen capture of a real-time collaborative document editing tool.

Shown in FIG. 4D is a sample screen capture 400D of a "real-time" documentation tool. A corresponding transformation that may be applied to an idea tree by this "real-time" documentation tool is shown at 401D. This real-time collaborative document editing tool is an alternative to the collaborative document editing tool, and may give participants the ability to work together and to coordinate each other's contributions to a document in real-time. Participants can either edit pre-existing files extracted from the idea tree, or start with nothing more than a document outline for a new document. Changes to the document may be tracked for each participant, and a chat room may be made available, allowing moderators and participants to coordinate their work in real-time.

As with the collaborative document editing tool, a moderator may derive an outline of the discussion by navigating the idea tree. Each paragraph or section of the document may be associated with an idea and exists as a node in the tree. Changes made to the document may be entered as edits in the appropriate records of tables in the appropriate nodes.

Since the tool allows participants to work in real-time on a specific document, it may be more effectively used on smaller parts of an idea tree, and larger collaborations may be better handled by the collaborative document editing tool.

(e) Document Commenting Tool

Figure 4E:
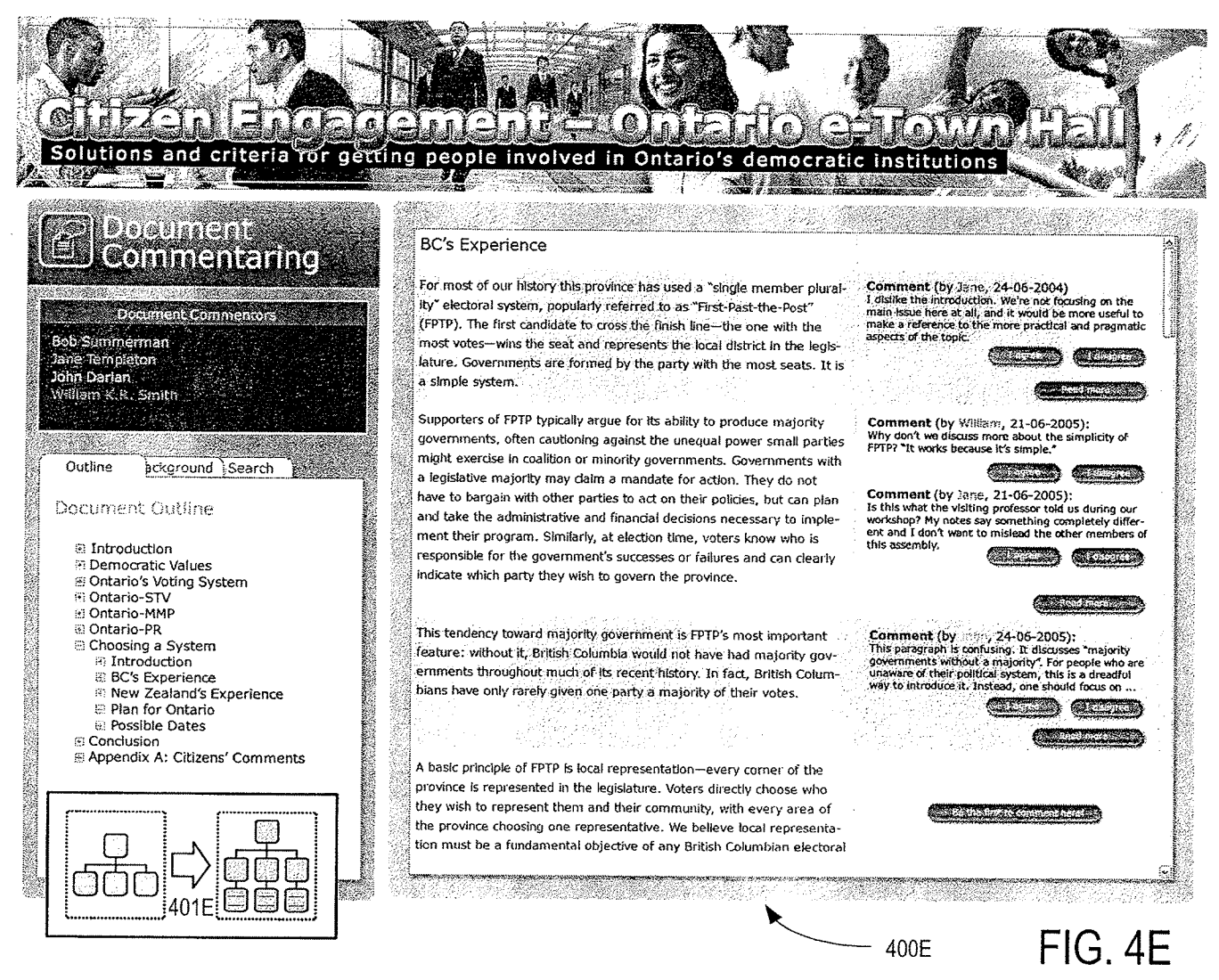

Shown in FIG. 4E is a sample screen capture 400E of a document commenting tool. The corresponding transformation that may be applied by this tool to an idea tree is shown at 401E. This document commenting tool may allow participants to comment on a document as created by one of the document tools mentioned above, or imported from another source. As shown at 401E, these comments may be added, for example, as child nodes to a respective idea presented in a patent node.

In an embodiment, this document commenting tool can be configured to select an entire idea tree, or to select a particular sub-tree in which a document has been created using one of the earlier mentioned document tools. The tables associated with each node of the idea tree may contain text entries that may be assembled as necessary to display a document. When a participant adds a comment to a paragraph using this document commenting tool, a new child node may be created under the node to which that paragraph belongs, and the comment may then be entered into a record of a table in the new child node.

As will be explained further below, other participants may have the option of ranking a comment added using the document commenting tool. This ranking information may be stored, for example, as entries in the table of node containing the comments. In this manner, moderators may be directed, for example, to deal with the most popular comments based on ranking by all of the participants.

Again, participants or the moderator may logically link the document commenting tool to a particular node, and direct their feedback to specific sections of a document. As noted at 401E, these comment nodes may be nodes in the general sense, and can become seeds for another brainstorm. The comments can also be processed by a ranking or categorization tool, or can be assembled into a new document which can in turn be commented on again, thereby creating an iterative process.

(f) Ranking Tool

Figure 4F:
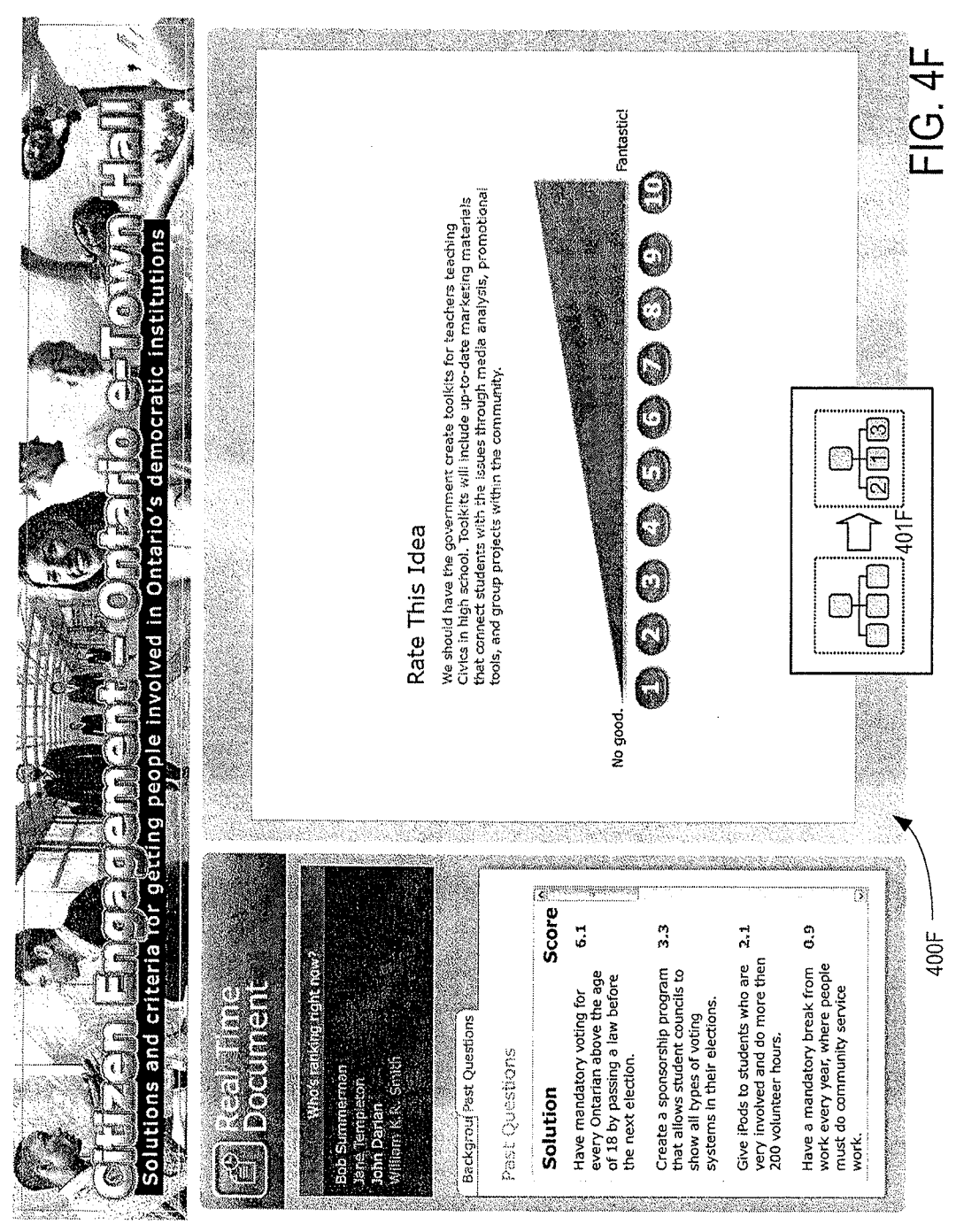

Shown in FIG. 4F is a sample screen capture 400F of a ranking tool which may be used to rank ideas within the idea tree. A corresponding transformation applied by this tool to an idea tree is shown at 401F.

By way of example, participants may be asked to rate an idea on a numeric scale, or simply with an agree or disagree indication. The ranking tool may use as an input a collection of nodes that are siblings on the idea tree. Amongst the sibling nodes, the ranking tool can tabulate, for example, the relative rank of each sibling node. This relative rank information may be associated with a unique rank ID amongst the sibling nodes, so that relative rankings can be compared. The rank IDs may also be used to reconstitute the ranking of the nodes in the event that changes to the idea tree structure cause the nodes to no longer be siblings (i.e. the ranked nodes can be compared against each other using the results of a ranking operation even if the nodes are no longer siblings).

In an embodiment, participants can collaboratively create a ranking of a group of ideas or suggestions. The ranking tool may take as input a collection of nodes on the idea tree. One way of specifying this collection of nodes would be to link the ranking tool to a common parent, the child nodes of which form the input set. Each participant may then be presented with the ideas contained in the sibling nodes and asked to express an opinion (e.g. "Is this a good solution to the problem?" "Would you purchase this product?" or "Is this date convenient for you to hold a conference?"). Participants can then express their opinions on as many of the ideas as they may care to view, with the system aggregating the contributions of all participants to create a collective ranking of the ideas.

The ranking may then be stored as a doubly-linked list in the data tables of all the nodes involved. As will be appreciated by those skilled in the art, in a doubly-linked list, each element in an ordered list contains a pointer to the next element and a pointer to the previous element. By traversing these pointers in both directions to the end of the chain, a set of nodes upon which such a ranking is performed may later be reconstructed. The ranking may also survive node deletion by updating the doubly-linked list as appropriate (i.e. the pointers in the nodes adjacent the deleted node are updated to reflect the deletion). This effectively removes a particular node from the list, but the relative ordering of all other nodes is retained. It will also be appreciated that a node can participate in more than one ranking, since each ranking operation simply adds a ranking entry to the node's data table. For example, one might want to know how Nodes A, B and C rank relative to each other, and then how Nodes B, D and E rank relative to each other. In this case, Node B may have two ranking entries, each with a rank ID and two pointers that form part of the doubly-linked list that defines the set of nodes upon which that particular rank was done.

(g) Solution Matrix Tool

Figure 4G:
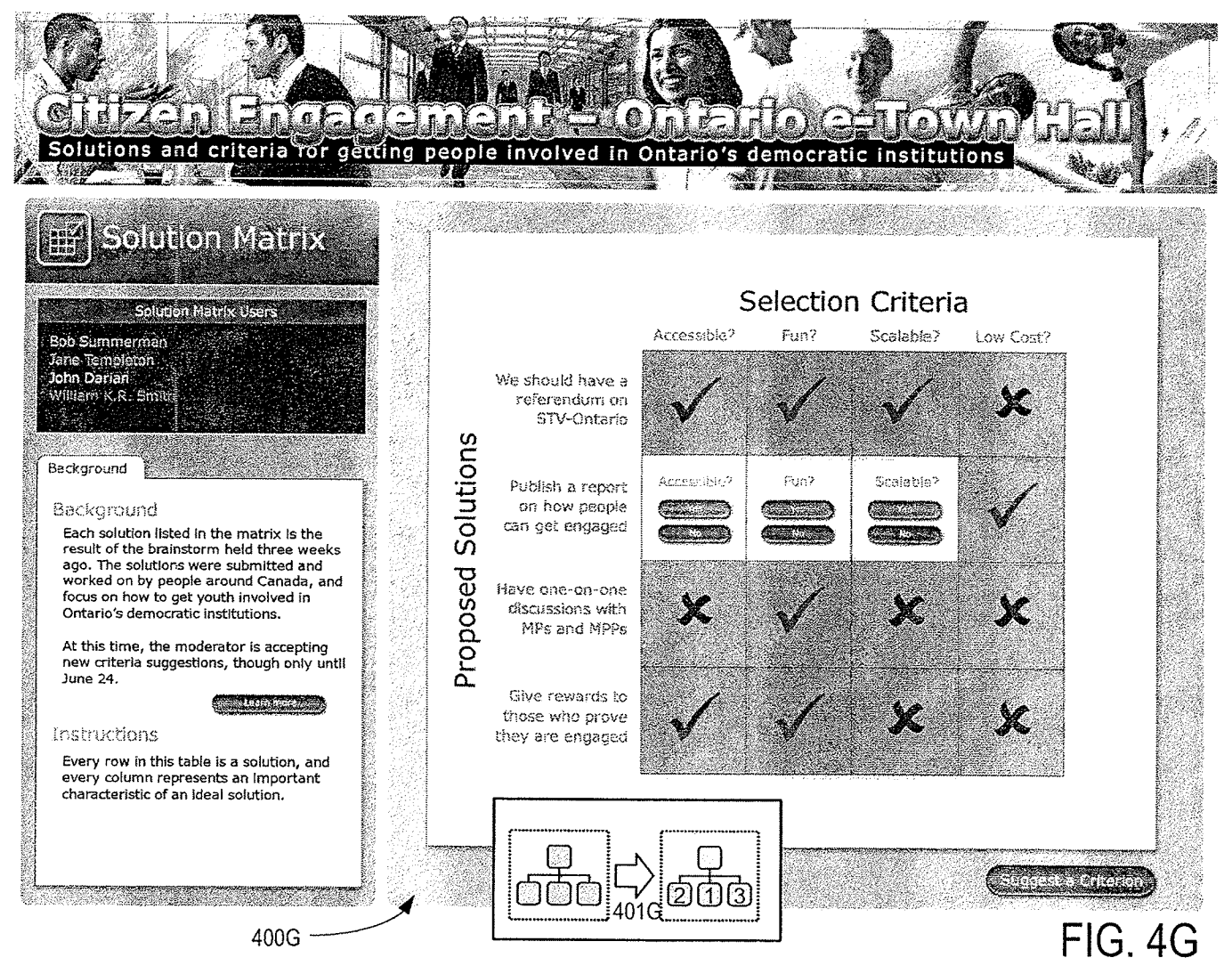

Shown in FIG. 4G is a sample screen capture 400G of a solution matrix tool. A corresponding transformation applied by this tool on an idea tree is shown at 401G.

This solution matrix tool may assist with the task of decision making by providing a set of criteria and a number of proposed solutions that may meet the criteria. The intersection between a particular solution (listed in rows), and a criterion (listed in columns), is where a participant may provide input on whether a particular solution has met certain criteria.

In an embodiment, participants may be able to see their own answers to these questions as they enter them (e.g. as shown by a check-mark or an x-mark). However, the solution matrix tool may be used to tabulate the collective results to see how many participants feel that a particular solution abides by specific criteria. Ideas that do not conform to a set of criteria may be deleted by a moderator, and the solution matrix tool may be used to showcase the preferred solutions.

The solution matrix tool may apply a similar transformation of the idea tree as the ranking tool. For example, the moderator may select the nodes to be rated and enter the criteria upon which participants should make their decisions. The moderator may also assign numerical weight values to each of the criteria to be used in computing the final rank. For each node, the solution matrix tool may store an aggregated rank, and how that idea did in each category.

Moderator Tools

In addition to the participant collaboration tools described above, certain moderator tools may also be provided. For example, a spell check tool may allow the moderator to spell check the text in a selection of nodes (e.g. a node and all of its associated child nodes). The spell check tool may present spelling errors, suggests corrections, and receive instructions to correct or to ignore. The spell check tool may end after the moderator completes the spell check task, and updates the idea tree with the corrected text.

The moderator may also be provided with a tree editor tool to control the growth of the idea tree. For example, the moderator may wish to periodically prune the idea tree by eliminating branches of ideas that are outdated, or irrelevant to a discussion. The tree editor tool may also allow the moderator to view the idea tree, move or delete nodes, and save a modified version of the idea tree. In an embodiment, all of these editing actions may be undone by backtracking each step, or by reverting back to a previously saved version of the idea tree.

The moderator may also be provided with management tools that may be used to keep track of activity summaries, participant lists, and access control lists. These management tools may provide the ability to query the activity summaries to examine the activities of various participants (for example, to determine who should be given which level of access). For example, the moderator may be given the authority to modify the access control list for a particular collaboration project, or for a particular collaborative tool.

Sample Tool Workflows

To illustrate how different tools may be used to simulate a workflow having a sequential progression, some sample tool workflows are now described.

The first example is a large-scale collaboration for authoring a document addressing a particular project topic. Using the brainstorm chat tool, a group of participants may brainstorm the project topic, and possibly generate a number of sub-ideas that may be added to an idea tree as sub-nodes. Each sub-node in turn could be expanded upon until the idea tree has grown to include ideas and collaborative input from the participants.

Next, using a solution matrix tool, the ideas presented in the idea tree may be ranked by the participants, and poorly ranked ideas may be eliminated as may be appropriate. Participants may then be asked to comment on the pros and cons of the remaining solutions, as measured against a set of criteria.

Using the results of the solution matrix tool, a collaborative document editing tool could be used to create a document outline where each major sub-theme may be presented as a chapter, and each idea about the sub-theme may be presented as a section within each chapter. Introduction and conclusion sections may be added as well. The document may undergo amendments with participation from many participants. A moderator may play the role of an editor to control the growth of the document as may be appropriate.

As another illustrative example, a group troubleshooting project is now described. First, a group may start an online project where, using the brainstorm chat tool, members are encouraged to list problems. Using the categorizer tool, the problems may be categorized using group-recommended categories. Next, the ranking tool may be used to determine which of the problems are most pertinent for discussion by the group by collecting rankings from the participants. Less pertinent problems may be deleted, or left to be dealt with at a later time. Of the remaining problems, members may use the brainstorm chat tool to consider possible solutions to the problems identified as being the most pertinent. Once this process of proposing solutions is complete, the ranking tool may again be used to rank the solutions based on perceived effectiveness in dealing with a problem. Using the solution matrix tool, the best solution may be selected from a number of solutions presented, given their effectiveness in meeting defined criteria.

The Toolkit Interface

In an Internet-based implementation, participants may be able to access the collaboration toolkit by going to a website that implements the toolkit and contains links to various projects. For example, the collaboration tools main page may have a list of all projects that may be accessed. The order of listing of projects on the webpage may be determined by popularity as measured by the amount of activity, i.e., more popular projects may be placed closer to the top of the listing. Projects in which the level of participant activity may have changed drastically could also be identified as being very active, and placed closer to the top of the listing. This may ensure that projects are appropriately rotated within the listing, based on the level of interest.

New projects can be created using a link on the main page. As an illustrative example, two options may be available for creating new projects: (i) the server can be set up so that anyone can create a project, or (ii) this option can be made available just to the moderator or to only a small number of participants, allowing for some control over the types of projects created. To create a new project, the moderator or participant may add basic project information, such as the project's name and purpose, and create a tentative schedule of workflow items. The project may then be made available on the main page.

Once a particular project is selected, the associated project page may be the starting point for getting involved in the project. This project page may be used to access a particular collaborative tool (e.g. one of the tools as described earlier), as made available by the moderator. The project page may also contain summaries of any work already completed on the project using other collaboration tools. Participants can add themselves as contributors to the project, which may result in their "handle" being placed on a list of participants on the project page.

In an embodiment, each tool may be configured as a client process that is unique to the specific tool, allowing participants to interact with the tool and with other participants. Tools may be configured to create summary documents that summarize the actions of participants, and the transformations applied to the idea tree using the tools. For example, a document creation tool might present the document, a categorizer tool may show the final categorization, and a ranking tool would show the final rankings of the ideas.

In an embodiment, each participant may be provided with a personal profile. Wherever a participant's name is shown, a click on the name (e.g. using a mouse) may display the activity log for all projects that the participant has contributed to. The personal profile for each participant may also contain a personal description space, where the user can post a short personal description. Additional profile items can be set up by the server administrator.

If a participant wishes to make his or her contributions anonymously, they may do so by modifying their personal settings. Anonymous contributions may be labelled as being anonymous within project archives. If deemed necessary to avoid an undesired skew in the results from too many anonymous participants with a particular view, a project moderator may decide to disallow anonymous contributions in some or all portions of a project. In this case, if a participant has chosen to remain anonymous, a tool could either block their contributions, or ask if the user is willing to forfeit their anonymity in order to access and participate in the project or tool in question.

In an embodiment, to assist the moderator, a wizard tool may be provided which asks a number of appropriate questions. For example, the wizard may ask a series of "What do you want to do next?" questions. These questions may focus on finding out what a moderator wishes to do, and helping him or her choose the proper tool or set of tools to meet their goals. A moderator may then choose which portion of the idea tree to use as data for a particular tool, and link the tool to the appropriate node accordingly. Tool-specific wizards may also be provided which may help in ensuring that a moderator chooses the proper tool settings.

IT Architecture

Figure 5:
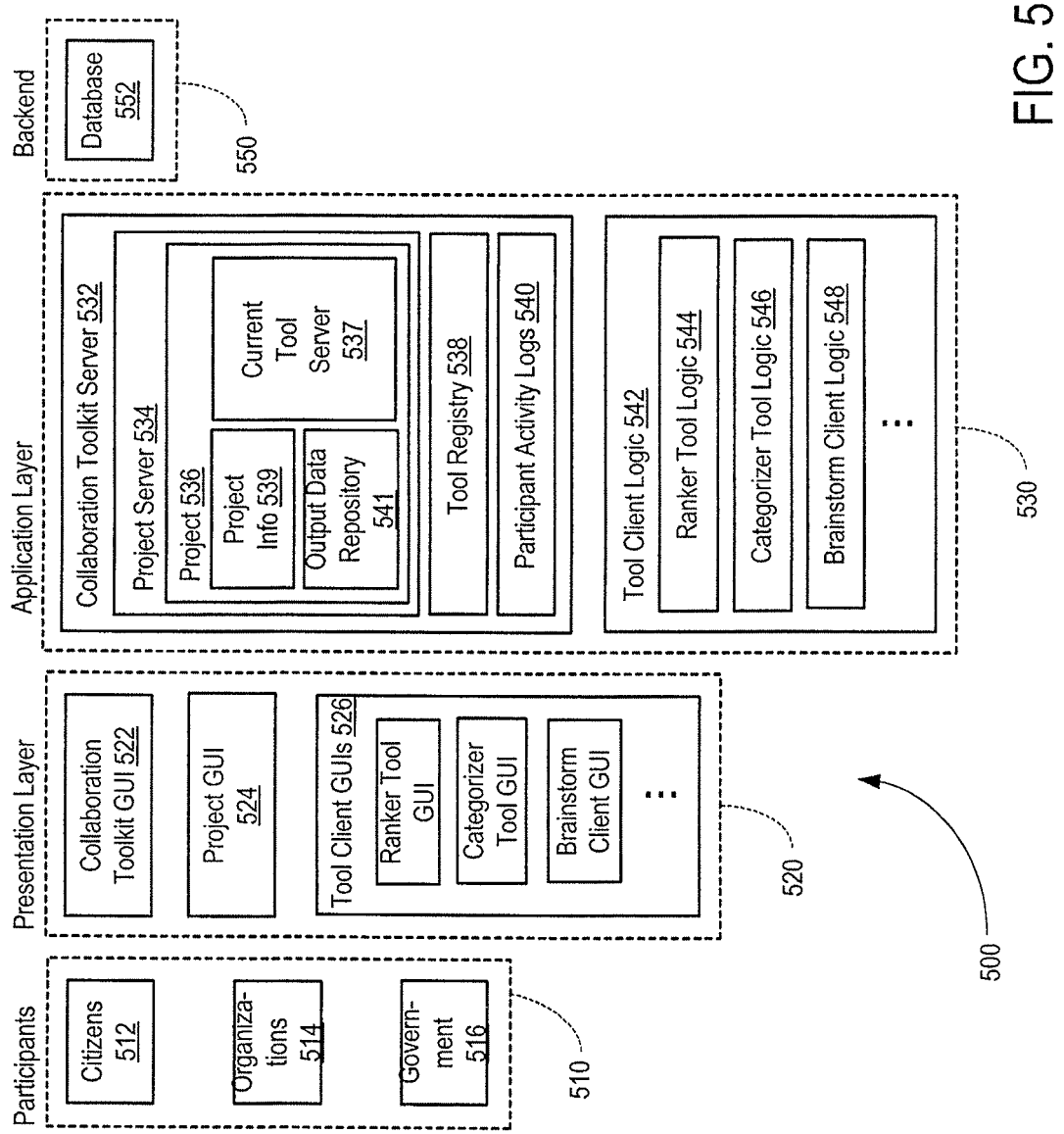
FIG. 5 shows a schematic diagram of an illustrative IT architecture for the tools.

An illustrative architectural overview of the collaboration toolkit is shown in FIG. 5. As previously mentioned, this IT architecture may be embodied in suitably configured data processing systems (e.g. data processing system 100 of FIG. 1), and associated communications networks, devices, software and firmware.

As shown in FIG. 5, the collaboration toolkit may comprise a presentation layer 520 and an application layer 530 positioned between participants 510 (e.g. citizens 512, organizations 514, government 516), and a back-end 550 (containing database 552). The presentation layer 520 may be designed, for example, using IBM's Websphere™ Portal Server. The application layer 530 responsible for the business logic may be designed, for example, on IBM's Websphere™ Application Server. For the back-end 550, IBM's DB2™ Information Management Software may be used as the database 552. The presentation layer 520 and application layer 530 may use web services to communicate, and the application layer 530 may communicate with the back-end database 552 using an appropriate protocol, such as the Java™ DataBase Connectivity ("JDBC") protocol for example.

At the presentation layer 520, graphical user interfaces may be provided for each of the components of the application layer, including a collaboration toolkit GUI 522, a project GUI 524, and various tool GUIs 526.

The presentation layer 520 is responsible for all elements related directly to the participants 510. It may consists of a number of components, including a collaboration toolkit GUI 522, a project GUI 524, and tool client GUIs 526. The collaboration toolkit GUI 522 provides all interface and presentation elements of the collaboration toolkit server 532 and the project GUI 524 provides all interface and presentation elements of the project servers 534 as described below. The tool client GUIs 526 provide all interface elements for the various collaborative tools 544 as instantiated in a tool server 537 (see below).

By way of example, the collaboration toolkit GUI 522 may consist of a number of J2EE™ (Java 2 Platform, Enterprise Edition) portlets that could be deployed on IBM's Websphere™ Portal Server platform. Tool client GUIs 526 may also be designed as portlets. Depending on the tool, the interface may either be designed as HTML (HyperText Markup Language), or as an encapsulated Java Applet.

The application layer 530 may consist of a number of components, including: (i) a collaboration toolkit server 532; (ii) a project server 534; (iii) one or more tool servers 537; and (iv) tool server logic library 542. Generally speaking, a tool server 537 may be an instantiation of a tool server logic (i.e. one of 544, 546, etc.), which is the general server-side software needed to support the functionality of a particular collaborative tool (brainstorm chat tool, ranking tool, etc.). When a moderator selects a tool to use in the project, that tool's server logic is instantiated into a tool server 537. The tool server logic library 542 acts as a repository from which server-side software can be loaded as needed by a project. As described above, there can be more than one tool server 537 active in a project at the same time, each tool server 537 running the same or different tool server logic. For example, two tool servers 537 may run two brainstorm chat tools working on different nodes in the idea tree, or two tool servers 537 may run a brainstorm chat tool and a ranking tool concurrently. Project Servers 534 are described in more detail below.

The collaboration toolkit server 532 may also include a tool registry 538 of all tools that are currently available. This tool registry 538 may store, for example, the location of the tool server logic (544, 546, etc.) in the tool server logic library 542, the location of the matching tool client GUI in 526, and an associated tool wizard (not shown). The collaboration toolkit server 532 may also store a log of activity for each participant in participant activity logs 540, detailing how a participant has interacted throughout the different projects 536 on the various project servers 534.

Each project server 534 may contain the project information and business logic for a single project. Each project server 534 may store important information about the project 539, including the schedule of tools that have been used in the past, the schedule of tools to be used in the future, and various properties of the project. An output data repository 541 may store information outputted by each individual tool.

Each tool server 537 may have a number of outputs, for example: (i) an output tree after all transformations have been performed; (ii) an HTML output providing a visual representation of the output for participants to see what was accomplished; and (iii) a participant log to update individual user profile pages and participant activity logs 540.

Each tool client's logic (544, 546, etc.) may contain all of the business logic related to an individual tool's operation. As shown, the tool server logic library 542 may include logic for various tools, including a ranker tool logic 544, categorizer tool logic 546, brainstorm client logic 548, etc. For example, in the brainstorm chat tool, this tool server logic 548 would describe the transfer of information between a tool server 537 and a tool GUI running on the presentation layer 520, the storing of messages and idea data, and other server-side processing.

When a moderator starts a new tool in a project 536, a new tool server 537 is created and the chosen tool's server logic (544, 546, etc.) is loaded from the tool server logic library 542. A participant 510 accesses the website by logging in through the collaboration toolkit GUI 522 (which is connected to the collaboration toolkit server 532). The participant 510 then chooses a project 536 to access. The collaboration toolkit GUI 522 then loads the project GUI 524 which connects to the appropriate project server 534. The project server 534 verifies that the user has the appropriate privileges to access the project. The participant 510 uses the project GUI 524 to navigate the various information areas of the project and may eventually select to participate in one of the active collaborative tools. The project GUI 524 inquires about the tool on the appropriate tool server 537, looks up the tool in the tool registry 538 and loads the appropriate tool client GUI 526. The tool client GUI 526 connects to the appropriate tool server 537. The user can then interact with the tool via the tool client GUI.

Figure 6:
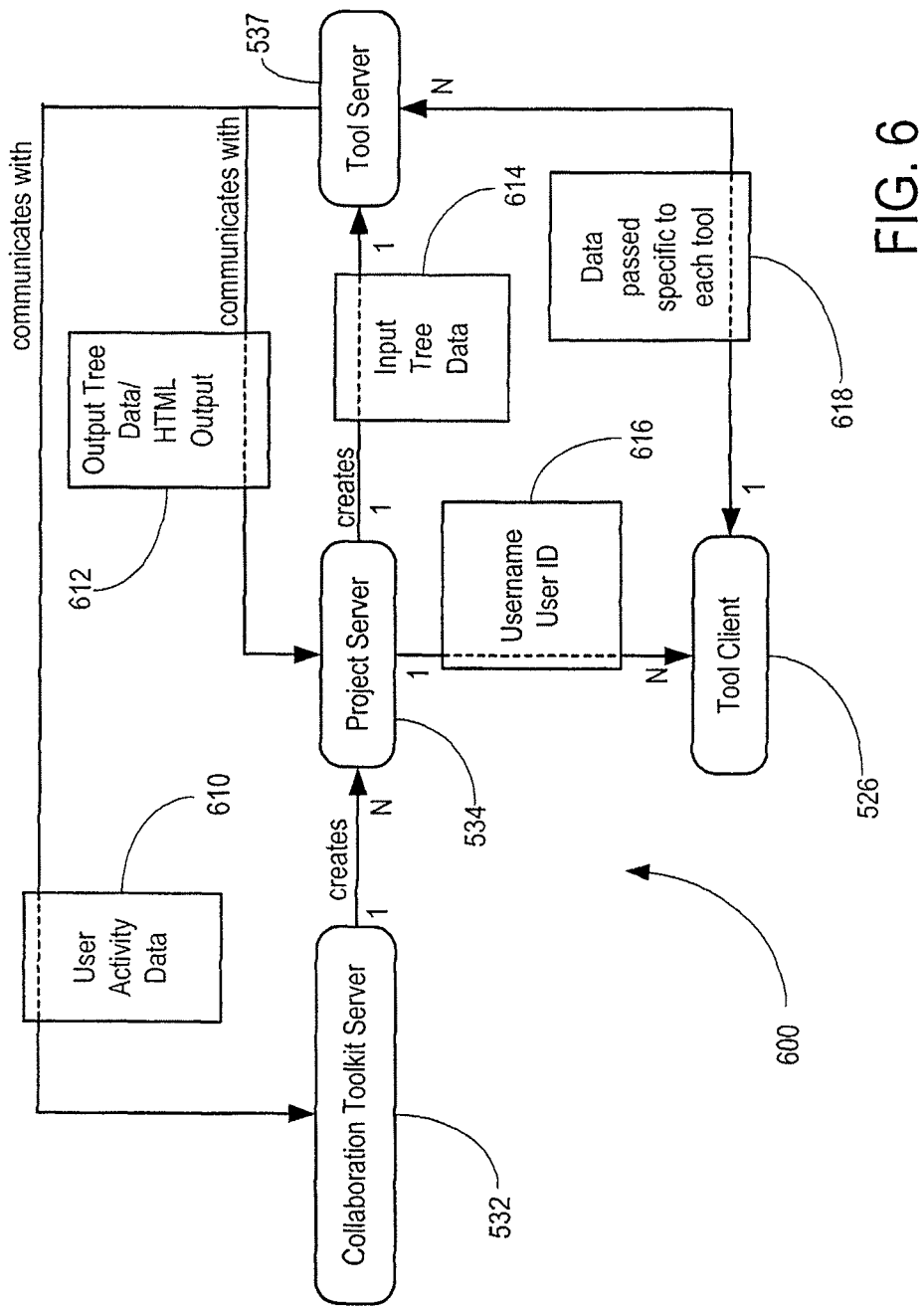
FIG. 6 shows a schematic diagram of an illustrative communication flow between some components of the IT architecture of FIG. 5.

An illustrative flow of communication between various components of FIG. 5 is shown in FIG. 6. At regular intervals, a tool server 537 communicates with a project server 534 and sends output tree data and HTML formatted output 612 to the project server 534. The tool client 537 also sends user activity data 610 to a collaboration toolkit server 532.

The collaboration toolkit server 532 may create one or more project servers 534. The project server 534 may initiate one or more tool servers 537, providing the tool servers 537 with input tree data 614. Project server 534 may also provide the username and user ID 616 of the participant to a tool client GUI 526. The tool client GUI 526 may then access the tool server 537. The tool client GUI 526 communicates with the tool server 537, at 618, in a manner specific to each tool.

It will be appreciated that the communication flow in FIG. 6 is illustrative, and that other communication flows may be possible.

While various illustrative embodiments of the invention have been described above, it will be appreciated by those skilled in the art that variations and modifications may be made. Thus, the scope of the invention is defined by the following claims.

What is claimed is:

1. A method for facilitating group collaboration by a plurality of collaborators, at least one of said collaborators being a moderator, the method comprising the steps of:
   providing a plurality of different collaboration tools, the plurality of different collaboration tools configured to collect data items from the plurality of collaborators, wherein the data items can be provided anonymously from one or more of the plurality of collaborators, and wherein the collaboration tools comprise at least a categorizer tool, a data item ranking tool, a solution matrix tool, and a moderator tool;
   providing a tree data structure, the tree data structure initially having only a root node;
   receiving input from at least one of the plurality of collaborators regarding one or more categories for said data items, wherein the categorizer tool is configured to categorize said data items according to said categories,
   receiving said data items from said plurality of collaborators;
   creating, using said received data items, a first level sub-node branching from said root node for each of said plurality of different collaboration tools;
   receiving, simultaneously or sequentially, additional data items from said plurality of collaborators via one or more of the plurality of different collaboration tools;
   analyzing the received additional data items;
   categorizing said data items using the categorization tool;
   associating, based on the analysis, each of the received additional data items with one or more of the first level sub-nodes;
   modifying the one or more of the first level sub-nodes with the received additional data items, wherein the modification comprises an addition of one or more additional sub-nodes, wherein said one or more additional sub-nodes is either an additional first level sub-node or a second level sub-node, wherein said second level sub-node branches from the first level sub-node, wherein each of said plurality of sub-nodes is associated with a non-transitory storage medium configured to store said received data items, and wherein said tree data structure is configured to allow said plurality of collaborators to provide data items simultaneously or sequentially, and further wherein each sub-node represents one or more of the received data items;
   presenting, by said ranking tool, at least some of said first level sub-nodes or second-level sub-nodes to the plurality of collaborators with a request to providing a ranking input for one or more of the sub-nodes;

receiving ranking input from at least one of the plurality of collaborators comprising a rank for at least one of the sub-nodes, wherein the ranking tool is configured to aggregate the received ranking input and create a collective ranking for each sub-node receiving a ranking;

presenting, by said solution matrix tool, a matrix comprising a set of criteria and, for each of said criteria, one or more proposed solutions that may meet that respective criterion, wherein at least some of the criteria and/or the proposed solutions comprise data items from the plurality of collaborators;

receiving input from the plurality of collaborators comprising a selection of one or more criterion for at least one of the set of criteria;

deleting, by a moderator using said moderator tool and based at least in part on the selections from the plurality of collaborators, one or more proposed solutions that do not meet a respective criterion; and presenting, by the solution matrix tool, a preferred proposed solution to each of the set of criteria.

2. The method of claim 1, further comprising the step of saving, in the non-transitory storage medium, the state of the tree data structure after each modification of the tree data structure.

3. The method of claim 1, wherein said received data items are heterogeneous data items comprising at least two different types of data.

4. The method of claim 1, further comprising the steps of:
providing a retrieval collaboration tool, the retrieval collaboration tool configured to collect a plurality of stored data items from said tree data structure; and
retrieving a plurality of stored data items from said tree data structure.

5. The method of claim 1, wherein at least some of said received data items are text-based, and the method further comprises the step of forming a document from said text-based data items, wherein said document is associated with one of said creates sub-nodes.

6. A system configured for facilitating group collaboration by a plurality of collaborators, at least one of said collaborators being a moderator, the system comprising:
a plurality of different collaboration tools, the plurality of different collaboration tools configured to collect data items from the plurality of collaborators, wherein the data items can be provided anonymously from one or more of the plurality of collaborators, and wherein the collaboration tools comprise at least a categorizer tool, a data item ranking tool, a solution matrix tool, and a moderator tool;
a tree data structure initially having only a root node;
a non-transitory storage medium configured to store said data items; and
a processor programmed to perform the steps of:
receiving input from at least one of the plurality of collaborators regarding one or more categories for said data items, wherein the categorizer tool is configured to categorize said data items according to said categories,
receiving said data items from said plurality of collaborators;
creating, using said received data items, a first level sub-node branching from said root node for each of said plurality of different collaboration tools;

receiving, simultaneously or sequentially, additional data items from said plurality of collaborators via one or more of the plurality of different collaboration tools;
analyzing the received additional data items;
categorizing said data items using the categorization tool;
associating, based on the analysis, each of the received additional data items with one or more of the first level sub-nodes; and
modifying the one or more of the first level sub-nodes with the received additional data items, wherein the modification comprises an addition of one or more additional sub-nodes, wherein said one or more additional sub-nodes is either an additional first level sub-node or a second level sub-node, wherein said second level sub-node branches from the first level sub-node, and further wherein said tree data structure is configured to allow said plurality of collaborators to provide data items simultaneously or sequentially;
presenting, by said ranking tool, at least some of said first level sub-nodes or second-level sub-nodes to the plurality of collaborators with a request to providing a ranking input for one or more of the sub-nodes;
receiving ranking input from at least one of the plurality of collaborators comprising a rank for at least one of the sub-nodes, wherein the ranking tool is configured to aggregate the received ranking input and create a collective ranking for each sub-node receiving a ranking;
presenting, by said solution matrix tool, a matrix comprising a set of criteria and, for each of said criteria, one or more proposed solutions that may meet that respective criterion, wherein at least some of the criteria and/or the proposed solutions comprise data items from the plurality of collaborators;
receiving input from the plurality of collaborators comprising a selection of one or more criterion for at least one of the set of criteria;
deleting, by a moderator using said moderator tool and based at least in part on the selections from the plurality of collaborators, one or more proposed solutions that do not meet a respective criterion; and
presenting, by the solution matrix tool, a preferred proposed solution to each of the set of criteria.

7. The system of claim 6, wherein said processor is further programmed to perform the step of saving, in the non-transitory storage medium, the state of the tree data structure after each modification of the tree data structure.

8. The system of claim 6, wherein said received data items are heterogeneous data items comprising at least two different types of data.

9. The system of claim 6, further comprising:
a retrieval collaboration tool, the retrieval collaboration tool configured to collect a plurality of stored data items from said tree data structure, and wherein said processor is further programmed to perform the step of retrieving a plurality of stored data items from said tree data structure.

10. The system of claim 6, wherein at least some of said received data items are text-based, and the processor is further programmed to perform the step of forming a document from said text-based data items, wherein said document is associated with one of said creates sub-nodes.

11. A non-transitory data processor readable medium storing data processor code that, when loaded into a data processing device, adapts the device to facilitate group collaboration by a plurality of collaborators, at least one of said collaborators being a moderator, the non-transitory data processor readable medium including:

code for providing a tree data structure, the tree data structure initially having only a root node;

code for receiving input from at least one of a plurality of collaborators regarding one or more categories for said data items, wherein a categorizer tool is configured to categorize data items according to said categories;

code for receiving a plurality of data items from the plurality of collaborators using the plurality of different collaboration tools, wherein the data items can be provided anonymously from one or more of the plurality of collaborators;

code for creating, using said received data items, a first level sub-node branching from said root node for each of said plurality of different collaboration tools;

code for receiving, simultaneously or sequentially, additional data items from said plurality of collaborators via one or more of the plurality of different collaboration tools;

code for analyzing the received additional data items;

code for categorizing said data items using the categorization tool;

code for associating, based on the analysis, each of the received additional data items with one or more of the first level sub-nodes;

code for modifying the one or more of the first level sub-nodes with the received additional data items, wherein the modification comprises an addition of one or more additional sub-nodes, wherein said one or more additional sub-nodes is either an additional first level sub-node or a second level sub-node, wherein said second level sub-node branches from the first level sub-node, wherein each of said plurality of sub-nodes is associated with a non-transitory storage medium configured to store said received data items, further wherein each sub-node represents one or more of the received data items, and further wherein said tree data structure is configured to allow said plurality of collaborators to provide data items simultaneously or sequentially;

code for presenting, by a ranking tool, at least some of said first level sub-nodes or second-level sub-nodes to the plurality of collaborators with a request to providing a ranking input for one or more of the sub-nodes;

code for receiving ranking input from at least one of the plurality of collaborators comprising a rank for at least one of the sub-nodes, wherein the ranking tool is configured to aggregate the received ranking input and create a collective ranking for each sub-node receiving a ranking;

code for presenting, by a solution matrix tool, a matrix comprising a set of criteria and, for each of said criteria, one or more proposed solutions that may meet that respective criterion, wherein at least some of the criteria and/or the proposed solutions comprise data items from the plurality of collaborators;

code for receiving input from the plurality of collaborators comprising a selection of one or more criterion for at least one of the set of criteria;

code for deleting, by a moderator using a moderator tool and based at least in part on the selections from the plurality of collaborators, one or more proposed solutions that do not meet a respective criterion; and code for presenting, by the solution matrix tool, a preferred proposed solution to each of the set of criteria.

12. The non-transitory data processor readable medium of claim 11, further comprising code for saving, in the non-transitory storage medium, the state of the tree data structure after each modification of the tree data structure.

13. The non-transitory data processor readable medium of claim 11, wherein said received data items are heterogeneous data items comprising at least two different types of data.

* * * * *